(12) United States Patent
Benz et al.

(10) Patent No.: US 8,585,091 B2
(45) Date of Patent: Nov. 19, 2013

(54) OCCUPANT PROTECTION DEVICE COMPRISING SAFETY VALVE

(75) Inventors: Jochen Benz, Ulm (DE); Lars Mast, Laupheim (DE); Jochen Lang, Ulm (DE); Christoph Pechhold, Erbach (DE); Robert Fleischmann, Neu-Ulm / Pfuhl (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/392,086

(22) PCT Filed: Aug. 30, 2010

(86) PCT No.: PCT/DE2010/001039
§ 371 (c)(1),
(2), (4) Date: Feb. 23, 2012

(87) PCT Pub. No.: WO2011/026474
PCT Pub. Date: Mar. 10, 2011

(65) Prior Publication Data
US 2012/0146317 A1    Jun. 14, 2012

(30) Foreign Application Priority Data
Sep. 4, 2009 (DE) .................. 10 2009 040 690

(51) Int. Cl.
*B60R 22/46* (2006.01)
(52) U.S. Cl.
USPC ........................................ 280/806; 297/480
(58) Field of Classification Search
CPC .................... B60R 22/46; B60R 22/4628
USPC .......... 242/374, 384.1, 390.8, 390.9; 60/632; 280/806, 807; 297/474, 475, 480; 138/89
See application file for complete search history.

(56) References Cited

U.S. PATENT DOCUMENTS

| 4,927,175 A | * | 5/1990 | Fohl | 280/806 |
|---|---|---|---|---|
| 5,472,229 A | * | 12/1995 | Bishop et al. | 280/728.2 |
| 5,718,447 A | | 2/1998 | Rose et al. | |
| 5,738,372 A | * | 4/1998 | Lowe et al. | 280/736 |

(Continued)

FOREIGN PATENT DOCUMENTS

| DE | 198 29 000 A1 | 6/1988 |
|---|---|---|
| DE | 100 33 319 A1 | 1/2002 |

(Continued)

OTHER PUBLICATIONS

International Preliminary Report on Patentability for PCT/DE2010/001039; Mar. 15, 2012; 7 pgs.

*Primary Examiner* — Joseph Rocca
(74) *Attorney, Agent, or Firm* — Foley & Lardner LLP (57) ABSTRACT

An occupant protection device including a pyrotechnical gas generator and a safety valve operating in a temperature-dependent manner and leading to the outside is connected to the gas generator. A sealing element of the safety valve is formed by a pin that includes a pin head, which is inserted from inside into a hole in a wall of a supply element such that the pin head bears against the inner face of the wall. A pin end, which is located on the outer face of the wall and protrudes outwardly through the hole, is plastically reshaped, so that the cross section of the pin end is larger than the cross section of the hole thereby forming a sealing portion which is larger in cross section than the cross section of the hole.

4 Claims, 12 Drawing Sheets

(56) References Cited

U.S. PATENT DOCUMENTS

| | | | |
|---|---|---|---|
| 5,875,634 A * | 3/1999 | Wohlenberg et al. | 60/632 |
| 6,017,060 A * | 1/2000 | Wilson et al. | 280/806 |
| 6,042,041 A * | 3/2000 | Foster et al. | 242/374 |
| 6,254,125 B1 | 7/2001 | Fassbaender | |
| 6,669,131 B2 * | 12/2003 | Takehara et al. | 242/374 |
| 6,729,649 B1 * | 5/2004 | Schmidt | 280/805 |
| 7,434,836 B2 | 10/2008 | Leiffheit et al. | |
| 7,520,531 B2 * | 4/2009 | Gammill | 280/737 |
| 8,286,999 B2 * | 10/2012 | Fukawatase et al. | 280/807 |
| 2002/0000487 A1 * | 1/2002 | Hamaue et al. | 242/374 |
| 2006/0261582 A1 * | 11/2006 | Fischer et al. | 280/736 |
| 2006/0261583 A1 | 11/2006 | Debler et al. | |
| 2007/0200328 A1 | 8/2007 | Leiffheit et al. | |
| 2007/0272786 A1 * | 11/2007 | Schmidt et al. | 242/374 |

FOREIGN PATENT DOCUMENTS

| | | |
|---|---|---|
| DE | 102 21 659 A1 | 8/2003 |
| DE | 10 2004 041 802 A1 | 8/2004 |
| EP | 0 807 557 A1 | 11/1997 |
| EP | 1 199 230 A2 | 4/2002 |
| EP | 0 889 809 B1 | 4/2003 |
| EP | 1738842 A1 * | 1/2007 |
| EP | 1 781 510 B1 | 5/2008 |

* cited by examiner

OCCUPANT PROTECTION DEVICE COMPRISING SAFETY VALVE

The invention relates to an occupant protection device comprising a pyrotechnical gas generator.

Occupant protection devices within the meaning of this application are formed, for example, by components of restraining systems for protecting vehicle occupants, for example by components of belt retractors, components of belt tensioners or components of airbag devices, or by restraining systems as such, namely for example by belt retractors, belt tensioners or airbag devices as such.

The object of the invention is to provide an occupant protection device comprising a pyrotechnical gas generator which provides a particularly high degree of safety.

This object is achieved according to the invention by an occupant protection device having the features as claimed in claim 1. Advantageous embodiments of the occupant protection device according to the invention are provided in the sub-claims.

Accordingly, an occupant protection device comprising a pyrotechnical gas generator is provided according to the invention, and in which a safety valve operating in a temperature-dependent manner and leading to the outside is connected to the gas generator.

An essential advantage of the occupant protection device according to the invention is seen to be that said occupant protection device also provides a very high level of safety for the vehicle occupants located in the vehicle, in the event of a vehicle fire. Even in the case of fire, when a very high temperature is present in the vehicle and, due to the high temperature, the gas generator is triggered automatically, i.e. without being deliberately externally ignited, it is possible for no injury to occur to the vehicle occupants; the safety valve operating in a temperature-dependent manner and leading to the outside is able to ensure that the safety valve opens in good time and the gas produced by the gas generator is able to be forced outwardly through the safety valve. By means of the safety valve operating in a temperature-dependent manner it may, therefore, be ensured that gas from the gas generator is discharged outwardly when a predetermined limit temperature is exceeded.

A further essential advantage of the occupant protection device according to the invention is that said occupant protection device only has to be designed for normal pressures within the nominal operating temperature range as excess pressure, by a pressure increase caused by fire and thus the inherent risk of the entire occupant protection device bursting, does not have to be considered due to the safety valve.

In order to ensure a particularly high level of operational safety in the event of a fire, it is regarded as advantageous if the safety valve comprises a sealing element which seals the safety valve in a gas-tight manner, i.e. even when subjected to gas by the gas generator, as long as the material temperature of the sealing element remains below a material limit temperature. The sealing capacity of the material of the sealing element is preferably reduced when the material limit temperature is exceeded, so that the safety valve is opened, at the latest when subjected to gas by the gas generator. The material limit temperature is preferably lower than the spontaneous ignition temperature of the gas generator and preferably higher than the maximum temperature of the nominal operating temperature range of the gas generator. The maximum nominal operating temperature of a gas generator is generally approximately 100° C.

A safety valve operating in a temperature-dependent manner may, for example, be formed by an opening or a bore in a pipe or an opening or bore in a gas-conducting carrier, which is sealed by a stopper. The material and design of such a stopper are preferably configured such that the stopper loses its strength and/or its shape above a predetermined operating temperature, for example above 105° C. Such a stopper may, for example, be formed by a plastics stopper which is welded in the opening or is clipped or bonded therein or riveted thereto. Instead of a plastics stopper, stoppers made of different materials (for example metals with a melting point of between 100° C. and 130° C.) may also be used; also, for example, stoppers with a fusible filling may be used. For example an alloy, for example a solder alloy, may be used as the filling. It is also possible to use adhesive films which contract, fuse or combust for the temperature-dependent sealing of an opening or a bore.

For sealing an opening or a bore a combustible material may also be used, said combustible material combusting in the presence of an open flame or heat and, as a result, opening up the opening or bore.

The safety valve may, for example, be directly applied to a gas conducting pipe. Alternatively, it is also possible to mount the safety valve in the region of carriers which are directly or indirectly connected to the gas generator. For example, threaded stoppers may be used with bores which are sealed by solder: if the solder fuses, the bore of the threaded stopper is opened up and the safety valve opened.

As already mentioned, a plurality of different embodiments for the safety valve operating in a temperature-dependent manner are conceivable. It is regarded as particularly advantageous, however, if the safety valve comprises a hole in a wall of a supply element as well as a sealing element which is inserted into the hole from the outside, and the sealing element comprises at least two snap elements which snap onto the wall and bear against the inner face of the wall.

Particularly preferably, such a sealing element comprises a recess into which a locking element may be inserted from the outside. Such an inserted locking element preferably results in at least two snap elements of the sealing element being forced radially outward so that the snap elements are pressed laterally against the hole wall of the hole. By pressing the snap elements in such a manner radially against the hole wall, it is prevented in a particularly simple manner that the sealing element is forced out of the hole by excess pressure and the safety valve is opened, although the limit temperature or opening temperature provided for opening the safety valve has not yet been reached. In other words, by means of the sealing element it is ensured in a particularly simple manner that the safety valve operates exclusively in a temperature-dependent manner and not additionally in a pressure-dependent manner.

The sealing element as a whole, or alternatively only the locking element, preferably consist of a material which when exceeding a limit temperature loses its sealing capacity, for example by fusion, deformation or combustion. The sealing element as a whole, or alternatively only the locking element, may, for example, consist of plastics, metal or a metal alloy with a melting temperature of between 110° C. and 130° C.

In order to simplify the pivoting of the snap elements radially to the outside, it is regarded as advantageous if the recess in the sealing element is formed by a through-hole which is sealed by the locking element. In this embodiment, the snap elements in the region of the hole may be completely separated from one another and thus pivoted particularly easily so that by means of the locking element a particularly fixed connection of the sealing element to the supply element may be ensured. In this embodiment, moreover, it is sufficient if only the locking element consists of a material which when exceeding the limit temperature and/or opening temperature loses its sealing capacity; the remaining parts of the sealing element may consist of a material which is more temperature-resistant.

According to a further preferred embodiment, it is provided that the safety valve comprises a sealing element which is formed by a pin comprising a pin head. The pin is inserted from inside into a hole in a wall of a supply element, for example a supply pipe, such that the pin head bears against the inner face of the wall. Subsequently, the pin end protruding outwardly through the hole is plastically reshaped, forming a sealing portion which is larger in cross section than the cross section of the hole. The safety valve operating in a temperature-dependent manner is in this case, therefore, formed by a plastically reshaped pin with a pin head which is inserted through a hole in a wall of a supply element. The pin preferably consists of a material which, when a limit temperature is exceeded, loses its sealing capacity, for example by fusion, deformation or combustion. The limit temperature is preferably in a temperature range of between 110° C. and 130° C.

Alternatively or additionally, the safety valve may also comprise a sealing element in the form of a blind rivet which from outside is inserted into a hole in a wall of a supply element and is riveted to the wall. Such riveting is preferably carried out by a corresponding riveting tool. The blind rivet preferably consists of a material which when exceeding a limit temperature which is, for example, between 110° C. and 130° C., loses its sealing capacity, for example by fusion, deformation or combustion.

According to a further preferred embodiment, it is provided that the safety valve comprises a sealing element in the form of a film which is positioned from outside or inside on a hole in a wall of a supply element and seals the hole. In this embodiment, particularly simple mounting is possible as only one film has to be attached in the region of a hole of the supply element. The film preferably consists of a material which when exceeding a limit temperature which, for example, is between 110° C. and 130° C., loses its sealing capacity, for example by fusion, deformation or combustion.

The occupant protection device is preferably a belt retractor with a tensioner drive which comprises the gas generator, a drive device connected to the belt spindle of the belt retractor and a supply element, in particular in the form of a supply pipe, which connects the gas generator and the drive device. Preferably, a plurality of thrust elements are present in the supply element which are accelerated after the gas generator is triggered and which indirectly or directly drive the drive device for retracting the safety belt. The safety valve preferably comprises a hole in the supply element, the hole particularly preferably being arranged in the portion between the gas generator and the first thrust element.

The invention relates, moreover, to a method for producing an occupant protection device comprising a pyrotechnical generator. According to the invention, it is provided in this regard that a hole leading to the outside in a supply element is sealed by a sealing element operating in a temperature-dependent manner.

The invention is described in more detail hereinafter with reference to exemplary embodiments, in which by way of example:

FIGS. 9-11 show by way of example the production of a safety valve, which is formed by a blind rivet, wherein FIGS. 9 to 10 show the production of such a blind rivet by way of example and FIG. 12 shows a further exemplary embodiment of a safety valve for the belt retractor according to FIG. 1, wherein the safety valve comprises a film.

In the figures, for the sake of clarity, the same reference numerals are always used for identical or comparable components.

Figure 1:
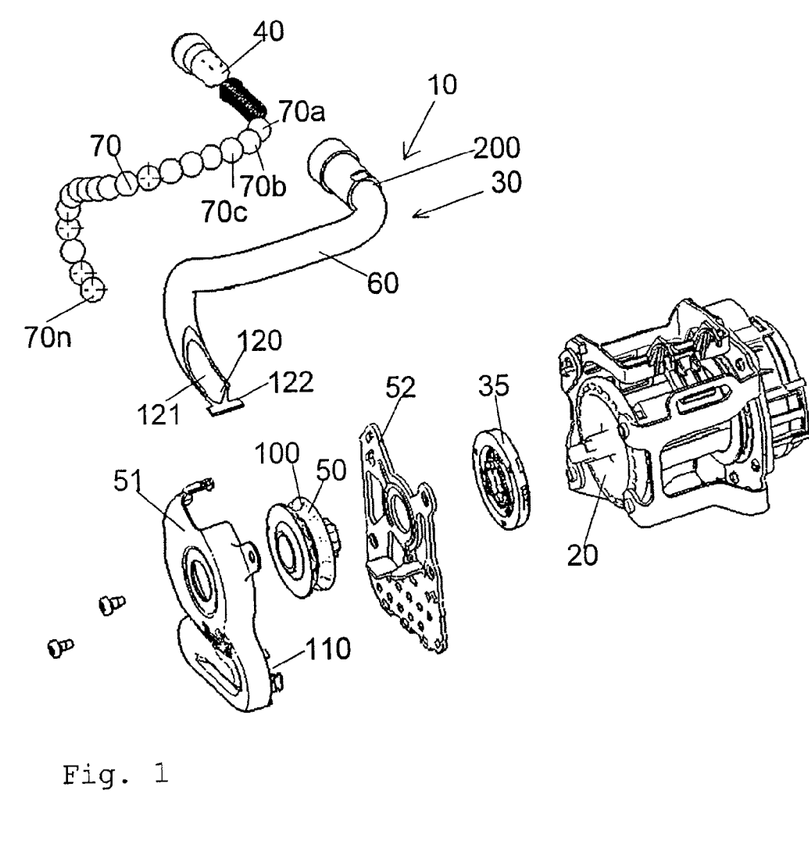
FIG. 1 shows an exemplary embodiment of an occupant protection device according to the invention which is formed by a belt retractor.

In FIG. 1, an exemplary embodiment of an occupant protection device which is formed by a belt retractor 10 is visible in a schematic exploded view. The belt retractor 10 comprises, amongst other things, a belt spindle 20, a tensioner drive 30 as well as a mass inertia coupling 35 connecting the tensioner drive 30 and the belt spindle 20.

The tensioner drive 30 comprises a pyrotechnical gas generator 40, for example in the form of a micro gas generator, a drive wheel 50, a curved supply pipe 60 connecting the gas generator 40 and the drive wheel 50, as well as a plurality of mass elements and/or thrust elements 70a to 70n. The thrust elements 70 are, for example, spherical.

The drive wheel 50 is rotatably held between a retaining cap 51 and a retaining plate 52 and comprises receiving shells 100 into which the thrust elements 70 engage, in order to drive the drive wheel. To this end, the thrust elements 70 are tangentially engaged with the drive wheel 50, and run tangentially past said drive wheel by engagement with the receiver shells 100, in order ultimately to reach a receptacle 110 arranged downstream.

Figure 2:
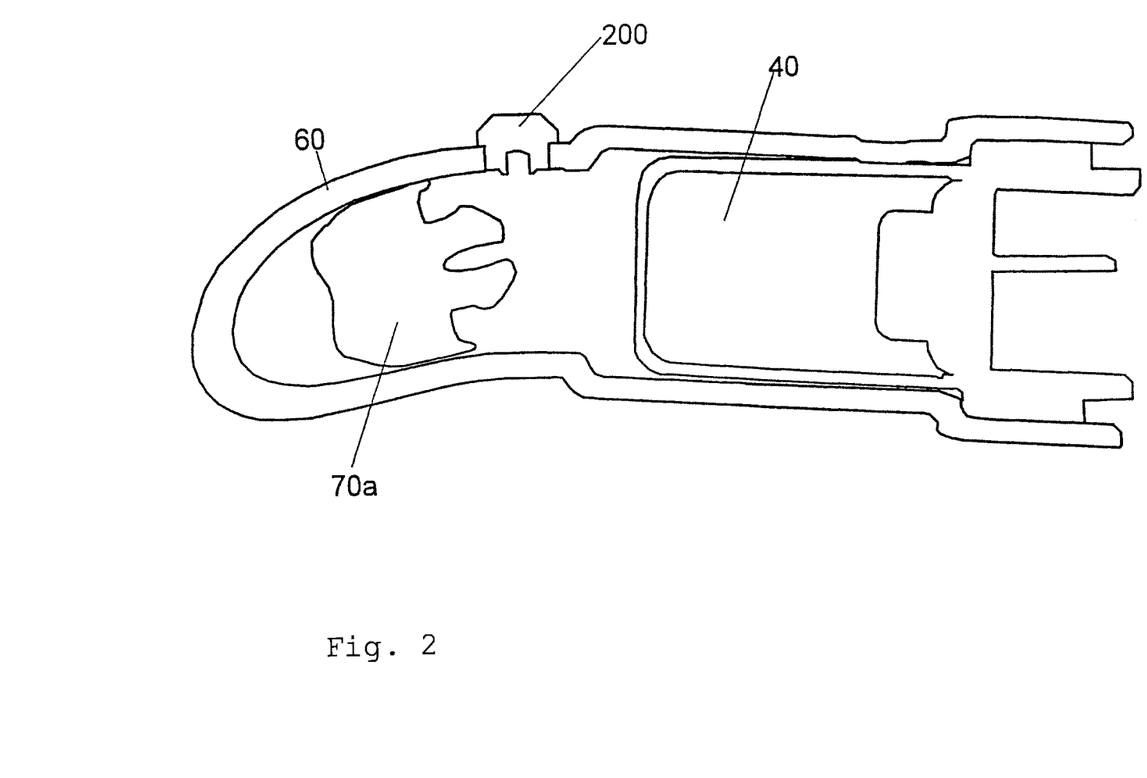
FIG. 2 shows the connecting region of a gas generator of the belt retractor according to FIG. 1 to a supply pipe of the belt retractor according to FIG. 1 in more detail.

In FIG. 2, the connecting piece between the gas generator 40 and the supply pipe 60 is shown in more detail. It may be seen that between the first thrust element 70a and the gas generator 40 a safety valve 200 operating in a temperature-dependent manner and leading to the outside is arranged on the supply pipe 60.

Exemplary embodiments of the safety valve 200 are explained in more detail hereinafter in connection with FIGS. 3 to 12.

Figure 3:
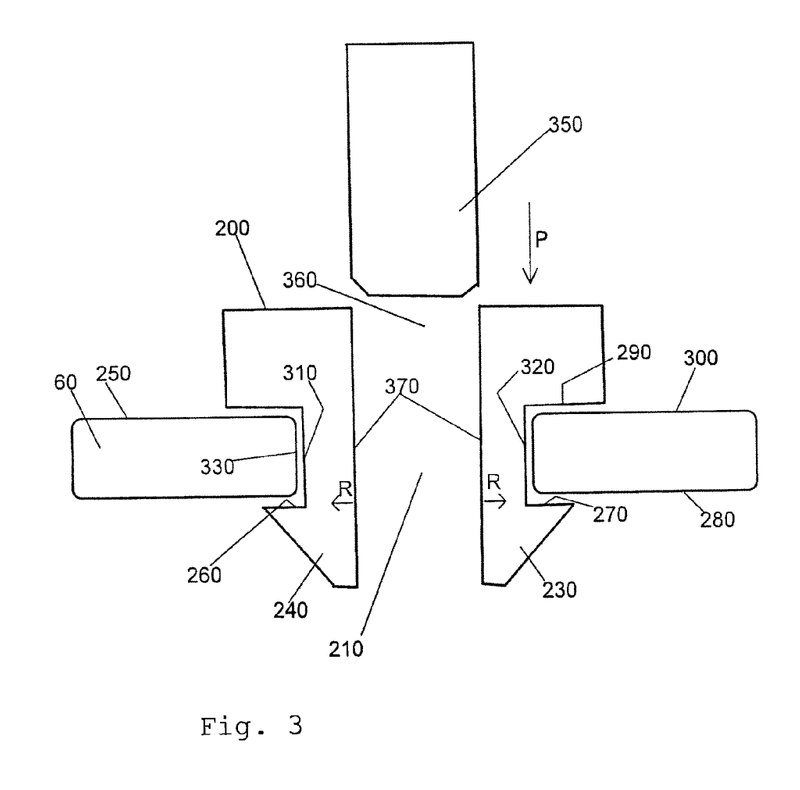
FIG. 3 shows an exemplary embodiment of a safety valve operating in a temperature-dependent manner for the belt retractor according to FIG. 1 during mounting.

In FIG. 3, an exemplary embodiment is shown of a safety valve 200 which is formed by a hole 210 in the supply pipe 60 and a sealing element 220 inserted into the hole 210. The sealing element 220 is pushed through the hole 210 in the direction of the arrow P, so that two snap elements 230 and 240 of the sealing element 220 are able to snap onto the wall 250 of the supply pipe 60. Due to this snap action, the internal edges 260 and 270 of the two snap elements 230 and 240 bear against the inner face 280 of the wall 250.

By the snap action of the two snap elements 230 and 240, moreover, the external edge 290 of the sealing element 220 is pressed onto the outer face 300 of the wall 250. Furthermore, the side walls 310 and 320 of the two snap elements 230 and 240 bear against the hole wall 330 of the hole 210.

In order to prevent the sealing element 220 from being able to be inadvertently forced out of the hole 210, for example by excess pressure in the supply pipe 60, a locking element 350 is provided which is inserted into a recess in the form of a through-hole 360 of the sealing element 220. The longitudinal direction of the through-hole 360 and thus the longitudinal direction of the locking element 350 preferably extend

- perpendicular, at least approximately perpendicular, to the internal edges 260 and 270 of the two snap elements 230 and 240, and/or
- perpendicular, at least approximately perpendicular, to the external edge 290 of the sealing element, and/or
- parallel, at least approximately parallel, to the hole wall 330 of the hole 210 and/or
- parallel, at least approximately parallel, to the side walls 310 and 320 of the two snap elements 230 and 240.

The object of the locking element 350 is to force the inner faces 370 of the two snap elements 230 and 240 radially—i.e. outwardly in the arrow directions R—so that the side walls 310 and 320 are pressed more firmly against the hole wall 330. In other words, the essential function of the locking element 350 is to ensure that it does not result in the sealing element 220 being forced out, as long as a predetermined material limit temperature for the sealing element 220 has not yet been reached and/or has not yet been exceeded.

However, if the temperature exceeds the material limit temperature which is predetermined by the material of the sealing element 220, the sealing element 220 loses its capacity for operation and/or sealing (for example by softening or fusion) and with excess pressure inside the supply pipe 60 is forced out of the hole 210, so that the gas of the gas generator 40 according to FIG. 1 is able to penetrate outwardly through the hole 210 of the supply pipe 60.

In the exemplary embodiment according to FIG. 3, various embodiments are conceivable:
1. The sealing element 220 as a whole is produced from a temperature-sensitive material.
2. All parts of the sealing element 220 are produced from a temperature-sensitive material, with the exception of the locking element 350.
3. Only the locking element 350 is produced from a temperature-sensitive material; the remaining components of the sealing element 220 consist of a material which is more temperature-resistant relative thereto.

In the embodiment according to FIG. 3, the locking element 350 may consist, for example, of plastics or metal, in particular a solder material, with a low melting temperature and the remaining components may consist of a different material with a higher melting temperature.

Figure 4:
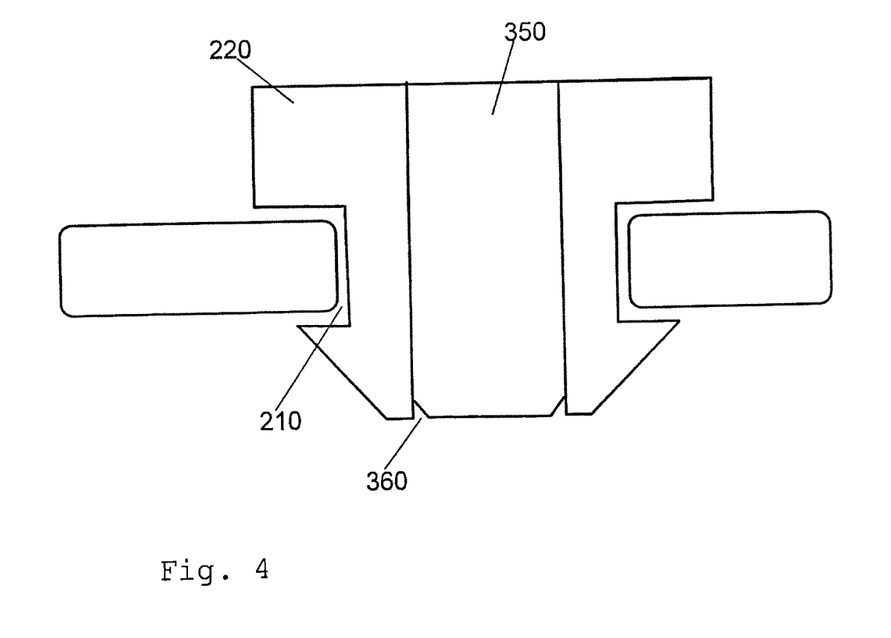
FIG. 4 shows the safety valve according to FIG. 3 after completing the mounting.

FIG. 4 shows by way of example the sealing element 220, after the locking element 350 has been inserted into the through-hole 360 and the mounting of the sealing element 220 in the hole 210 has been completed.

Figure 5:
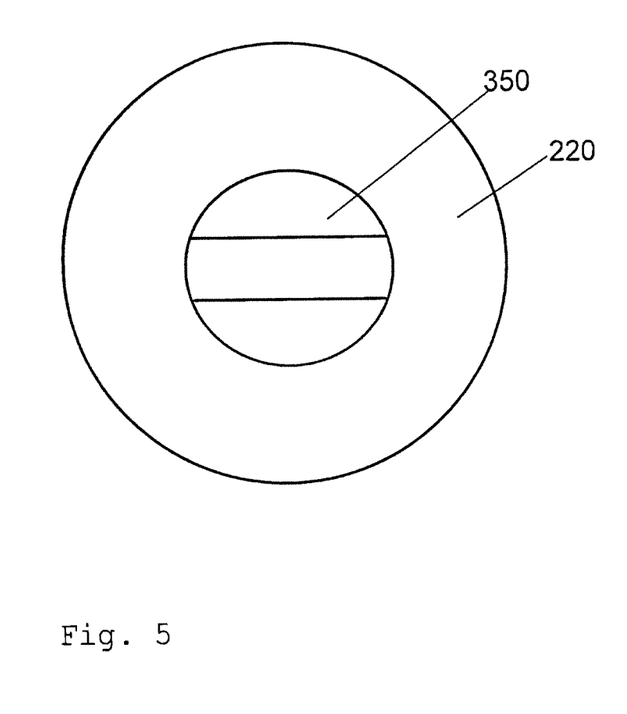
FIG. 5 shows a locking element of the safety valve according to FIGS. 3 and 4 in a plan view.

FIG. 5 shows by way of example the sealing element 220 according to FIGS. 3 and 4 in plan view. The sealing element 350 is visible which, for example, may be designed to be circular in cross section.

Figure 6:
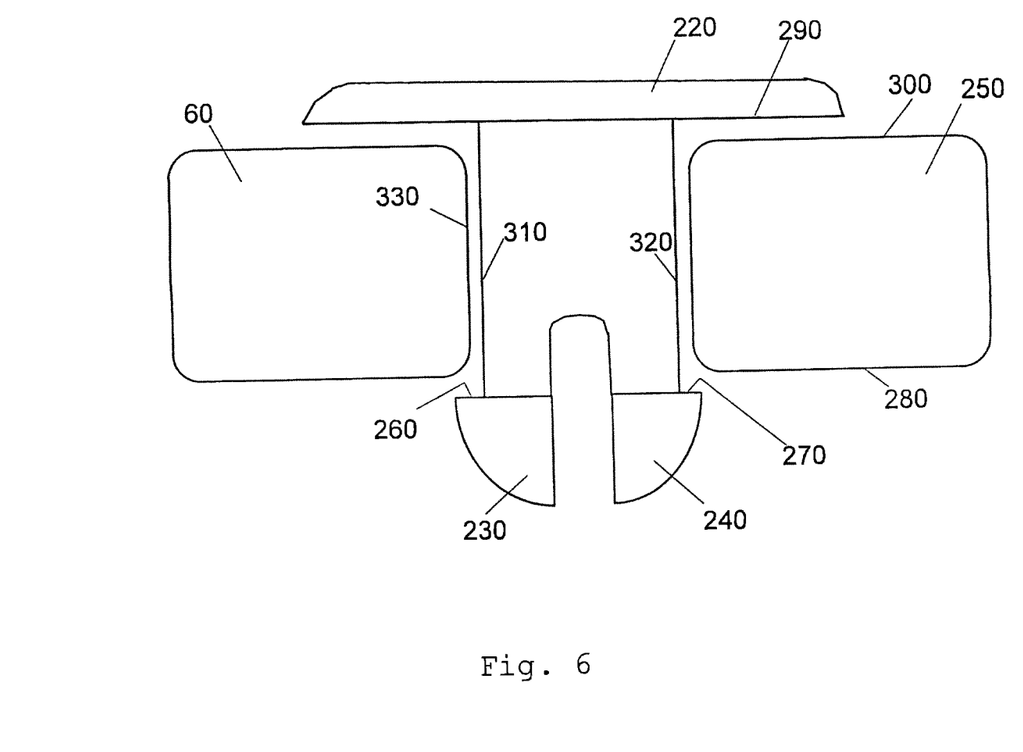
FIG. 6 shows a further exemplary embodiment of a safety valve operating in a temperature-dependent manner for the belt retractor according to FIG. 1.

In FIG. 6 a further exemplary embodiment is shown of a safety valve 200 operating in a temperature-dependent manner according to FIG. 1. A sealing element 220 is visible which from its construction and design corresponds to the sealing element 220 according to FIG. 3. In contrast to the exemplary embodiment according to FIG. 3, only the recess and/or the through-hole 360 is absent as well as the possibility of inserting a locking element 350 as shown in FIG. 3. The sealing element 220 according to FIG. 6 is thus exclusively locked by the snap elements 230 and 240, which with their internal edges 260 and 270 snap against the inner face 280 of the wall 250 and bear with their side walls 310 and 320 against the hole wall 330 of the hole 210 in the supply pipe 60. The sealing element 220 comprises, moreover, an external edge 290 which bears against the outside 300 of the wall in order to ensure the fixing of the sealing element 220.

Figure 7:
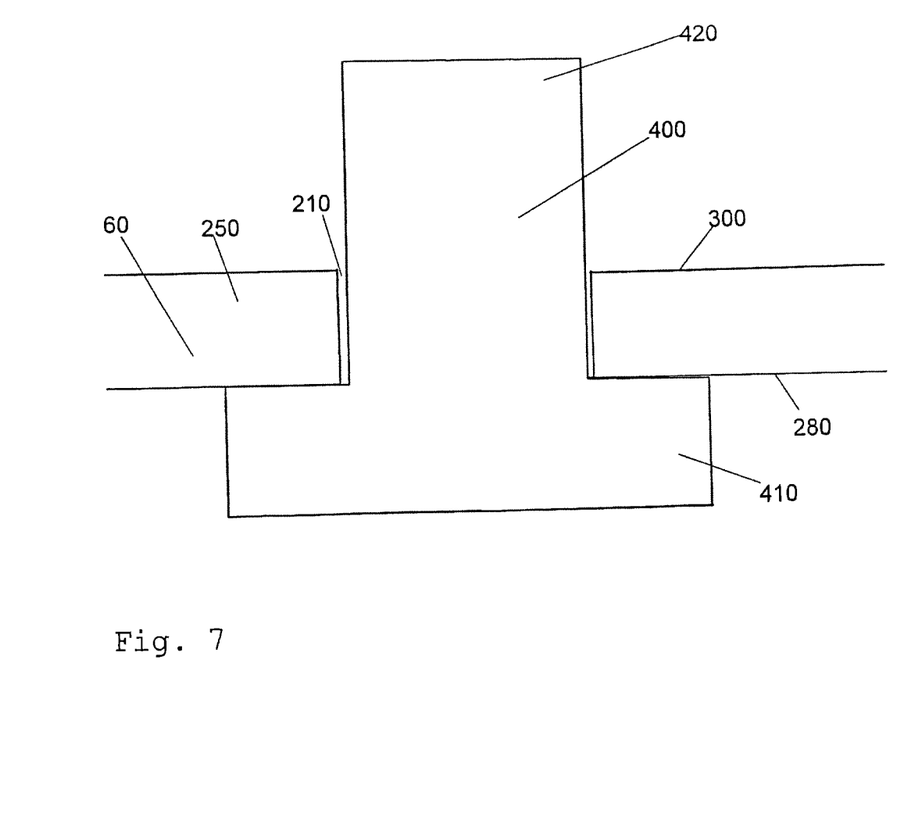
FIG. 7 shows a third exemplary embodiment of a safety valve operating in a temperature-dependent manner in the form of a pin with reshaped pin end.

In FIG. 7, a safety valve 200 for the belt retractor according to FIG. 1 is shown by way of example, and which comprises a pin 400. The pin 400 comprises a pin head 410 as well as a pin end 420. For mounting, the pin end 420 is inserted through the hole 210 from the inside of the supply pipe 60, until the pin head 410 bears against the inner face 280 of the wall 250 of the supply pipe 60. Subsequently, the pin end 420 which is located on the outer face 300 of the wall 250, is plastically reshaped so that the cross section of the pin end is larger than the cross section of the hole 210 (see FIG. 8). Thus by plastic reshaping the pin 400 is fixedly connected to the hole 210 and seals the hole 210 in a gas-tight manner. As soon as the pin temperature falls below a material limit temperature of the pin, the pin 400 seals the guide tube 60, even when the gas generator 40 produces a high gas pressure.

Figure 8:
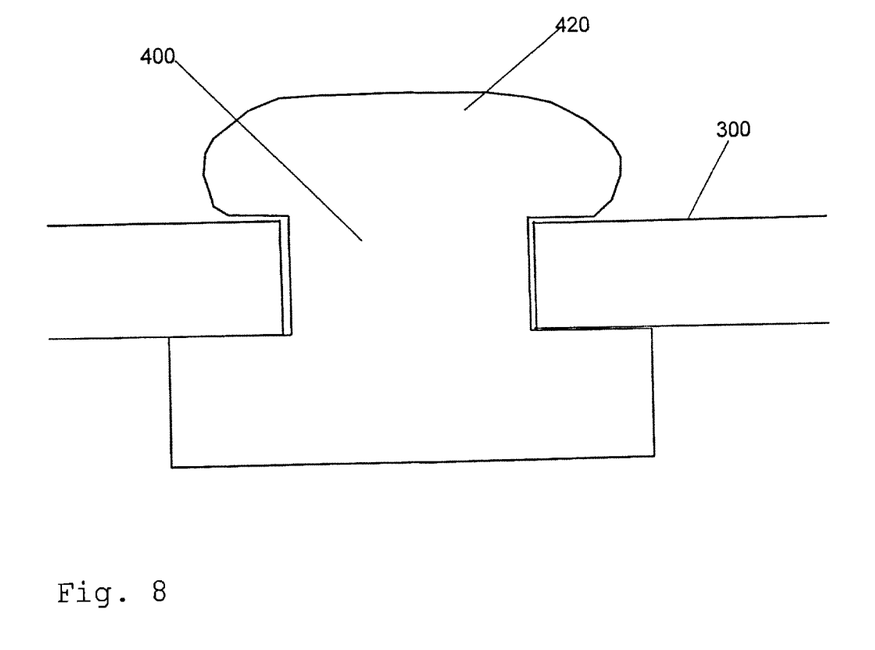
FIG. 8 shows the pin according to FIG. 7 after reshaping.

If, however, the material limit temperature of the pin 400 is exceeded, the sealing capacity of the material of the sealing element is reduced (for example by softening or fusion), so that the pin 400, at the latest when subjected to gas by the gas generator, opens up the hole 210 and the gas from the gas generator is able to escape outwardly from the supply pipe 60.

Figure 9:
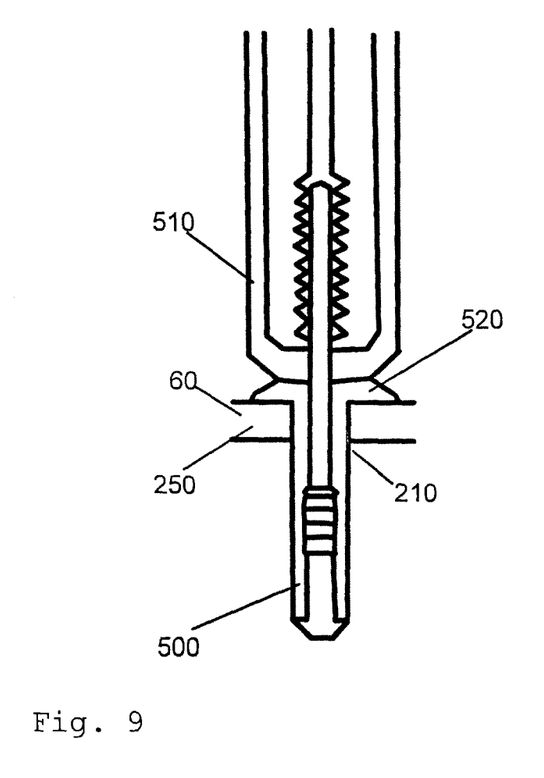
Figure 10:
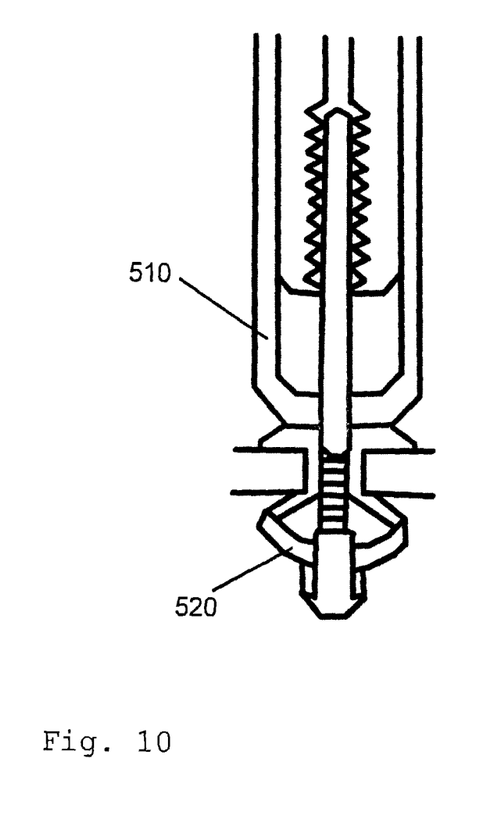
Figure 11:
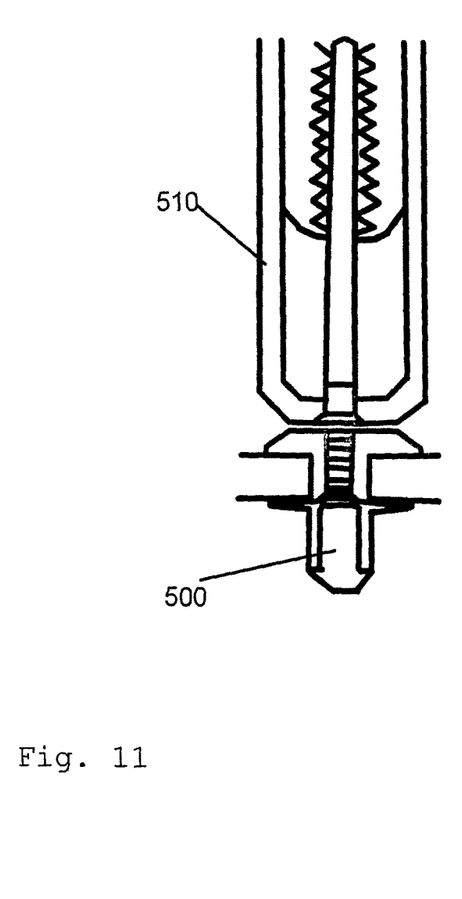

In connection with FIGS. 9 to 11, by way of example it is now explained how a safety valve operating in a temperature-dependent manner may be formed by a blind rivet 500. Thus FIG. 9 shows a blind rivet tool 510 with which a blind rivet blank 520 is pushed through a hole 210 in the wall 250 of the supply pipe 60.

After pushing through the blind rivet blank 520, the blind rivet tool 510 is activated and the blind rivet blank 520 is deformed. FIG. 10 shows this by way of example.

As soon as the deformation of the blind rivet blank 520 is finished and the blind rivet 500 is formed, the blind rivet tool 510 is removed from the blind rivet 500. The production of a safety valve operating in a temperature-dependent manner is thus complete. The safety valve is formed by the blind rivet 500 and the hole 210 in the wall 250 of the supply pipe 60. The blind rivet 500 seals the hole 210 in a gas-tight manner, as long as the temperature of the blind rivet 500 does not exceed the material limit temperature of the blind rivet. However, if the temperature of the blind rivet reaches or exceeds the material limit temperature, said blind rivet entirely or partially loses its sealing capacity (for example by softening or fusion) and opens up the hole 210 and is forced out of said hole, at the latest in the event of excess pressure by the gas generator 40. The blind rivet 500 thus forms in cooperation with the hole 210 a safety valve operating in a temperature-dependent manner which may be used for the belt retractor according to FIG. 1.

Figure 12:
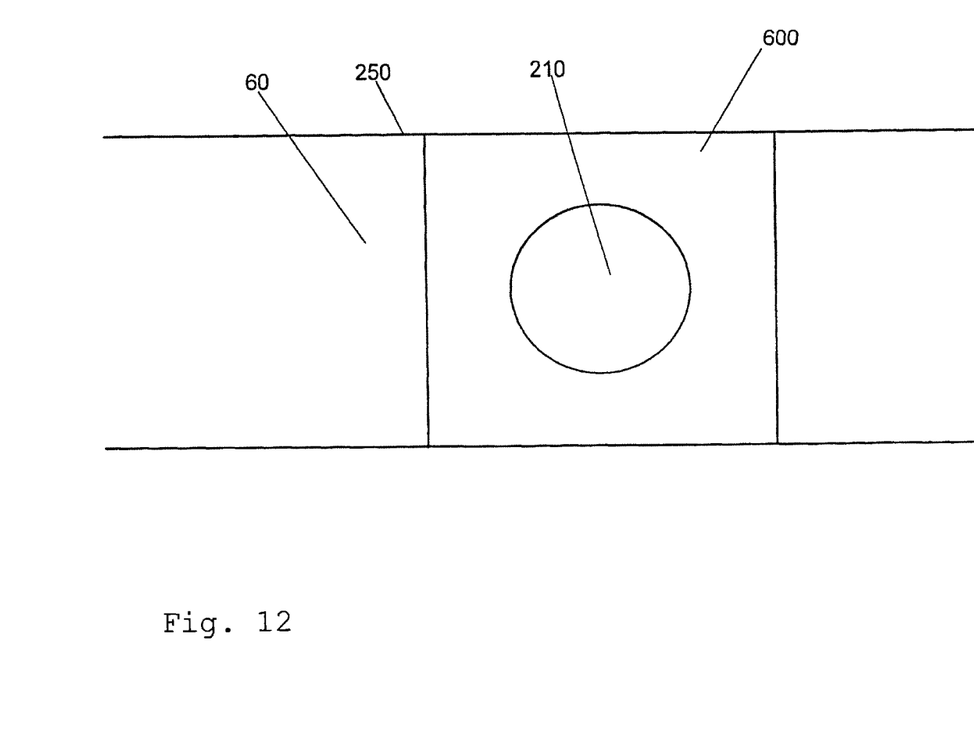

FIG. 12 shows by way of example a further variant of a safety valve for the belt retractor according to FIG. 1. The supply pipe 60 may be seen, in the wall 250 thereof a hole 210 having been produced, for example by boring. The hole 210 is sealed by a film 600 which has been applied externally or internally onto the hole 210, and seals the hole 210 in a gas-tight manner.

As long as the temperature of the film 600 remains below the material limit temperature of the film 600, the film 600 is able to seal the hole 210 in a gas-tight manner. However, if the temperature of the film 600 exceeds the material limit temperature, the film loses its sealing capacity (for example by softening or fusion) and opens up the hole 210, at the latest when subjected to gas by the gas generator 40 according to FIG. 1. The film 600, in combination with the hole 210, thus forms a safety valve operating in a temperature-dependent manner and which is able to be used in the belt retractor according to FIG. 1.

LIST OF REFERENCE NUMERALS

10 Belt retractor
20 Belt spindle
30 Tensioner drive
35 Mass inertia coupling
40 Gas generator
50 Drive wheel
51 Retaining cap
52 Retaining plate
60 Supply pipe
70 Thrust element
100 Receiver shells
110 Receptacle
200 Safety valve
210 Hole
220 Sealing element
230 Snap element
240 Snap element
250 Wall
260 Edge
270 Edge
280 Inner face
290 Edge
300 Outer face
310 Side wall
320 Side wall
330 Hole wall
350 Locking element
360 Through-hole
370 Inner face
400 Pin
410 Pin head
420 Pin end
500 Blind rivet
510 Blind rivet tool
520 Blind rivet blank
600 Film
P Arrow direction
R Arrow direction

The invention claimed is:

1. An occupant protection device comprising:
   a pyrotechnical gas generator; and
   a safety valve operating in a temperature-dependent manner and leading to the outside is connected to the gas generator;
   wherein a sealing element of the safety valve is formed by a pin comprising a pin head, which is inserted from inside into a hole in a wall of a supply element such that the pin head bears against an inner face of the wall, and
   wherein a pin end, which is located on an outer face of the wall and protrudes outwardly through the hole, is plastically reshaped, so that a cross section of the pin end is larger than a cross section of the hole forming a sealing portion which is larger in cross section than the cross section of the hole.

2. The occupant protection device as claimed in claim 1, wherein the occupant protection device is formed by a belt retractor with a tensioner drive which comprises the gas generator, a drive device connected to a belt spindle of the belt retractor and a supply element, in the form of a supply pipe, which connects the gas generator and the drive device,
   wherein a plurality of thrust elements are present in the supply element which are accelerated after the gas generator is triggered and which indirectly or directly drive the drive device for retracting the safety belt, and
   wherein the safety valve comprises a hole in the supply element and the hole is arranged in the portion between the gas generator and the first thrust element.

3. The occupant protection device as claimed in claim 1, wherein the safety valve comprises a sealing element which seals the safety valve in a gas-tight manner, as long as the material temperature of the sealing element remains below a material limit temperature and
   wherein the sealing capacity of the material of the sealing element is reduced when the material limit temperature is exceeded and the safety valve is opened, at the latest when subjected to gas by the gas generator,
   wherein the material limit temperature is lower than the spontaneous ignition temperature of the gas generator and higher than the maximum temperature of the operating temperature range of the gas generator.

4. A method for producing an occupant protection device comprising:
   providing a pyrotechnical gas generator and a hole leading to an outside in a supply element;
   sealing said hole by a sealing element operating in a temperature-dependent manner;
   wherein the sealing element is formed by a pin comprising a pin head, which is inserted from inside into the hole in the supply element such that the pin head bears against an inner face of a wall of the supply element, and
   wherein a pin end, which is located on an outer face of the wall and protrudes outwardly through the hole, is plastically reshaped, so that a cross section of the pin end is larger than a cross section of the hole forming a sealing portion which is larger in cross section than the cross section of the hole.

* * * * *